United States Patent

Haag et al.

[11] Patent Number: 6,127,626
[45] Date of Patent: Oct. 3, 2000

[54] METHOD FOR INSTALLING A TELECOMMUNICATION CABLE ON A SUPPORTING CABLE AND ARRANGEMENT PRODUCED THEREBY

[75] Inventors: Helmut Haag, Titz; Georg Hög, Mönchengladbach, both of Germany

[73] Assignee: Alcatel, Paris, France

[21] Appl. No.: 09/041,590

[22] Filed: Mar. 12, 1998

[30] Foreign Application Priority Data

Mar. 29, 1997 [DE] Germany ............ 197 13 308

[51] Int. Cl.⁷ .......... H02G 7/00; H02G 7/05; H02G 7/10
[52] U.S. Cl. .......... 174/41; 174/40 R; 174/42; 385/103; 385/113; 385/134
[58] Field of Search .......... 174/40 R, 42, 174/41, 113, 135; 385/100, 101, 103, 113, 134

[56] References Cited

U.S. PATENT DOCUMENTS

| 4,673,247 | 6/1987 | Oestreich | 350/36.23 |
| 4,717,237 | 1/1988 | Austin | 350/96.23 |
| 4,772,090 | 9/1988 | Atkins et al. | 350/96.23 |
| 5,044,722 | 9/1991 | Voser | 385/113 |
| 5,513,292 | 4/1996 | Rowland et al. | 385/100 |

FOREIGN PATENT DOCUMENTS

| 0543379A1 | 5/1993 | European Pat. Off. |
| 2106881 | 8/1972 | Germany . |
| 19519773A1 | 12/1996 | Germany . |
| 1952038A1 | 12/1996 | Germany . |

*Primary Examiner*—Kristine Kincaid
*Assistant Examiner*—Mark Olds
*Attorney, Agent, or Firm*—Ware, Fressola, Van der Sluys & Adolphson LLP

[57] ABSTRACT

The invention concerns a method of installing a telecommunication cable (3) on a supporting cable (1), particularly on a ground or phase cable of a high voltage overhead line, whereby the telecommunication cable (3) is laid along the supporting cable (1) and is attached thereto in undulating form with the help of attaching elements (5; 11; 13; 15). This arrangement makes it possible to make repairs in a simple way on the supporting cable (1) and the telecommunication cable (3).

8 Claims, 3 Drawing Sheets

METHOD FOR INSTALLING A TELECOMMUNICATION CABLE ON A SUPPORTING CABLE AND ARRANGEMENT PRODUCED THEREBY

BACKGROUND OF THE INVENTION

1. Technical Field

The invention concerns a method of installing a telecommunication cable on a supporting cable, particularly on a ground or phase cable of a high voltage overhead line, whereby the telecommunication cable is laid along the supporting cable and is attached thereto using attaching elements, or an arrangement of a telecommunication cable on a supporting cable, particularly on a ground or phase cable of a high voltage overhead line, whereby the telecommunication cable is laid along the supporting cable and is attached thereto using attaching elements.

2. Description of the Prior Art

Several solutions are known for installing telecommunication cables on existing supporting cables, particularly on ground or phase cables of high voltage overhead lines. Thus EP 0 543 379 A1 describes an optical fiber cable which is helically wound around a phase cable of a high voltage overhead line. Such an arrangement has the disadvantage that in case of damage, for example damage due to lightning strikes, the phase cable with the optical fiber cable wound around it must be taken down, since the phase cable is not accessible for repairs. A repair of the optical fiber cable is nearly impossible because sufficient length for splicing is not available. Beyond that there is the danger of the wound optical fiber cable traveling to the lowest point of a line section due to the formation of garlands.

It is known from DE 195 19 773 A1 to secure an optical fiber cable to a high voltage overhead line with the help of attaching means. In that case, the optical fiber cable runs parallel to the ground or phase cable of the high voltage overhead line, so that no repair of the optical fiber cable is possible, e.g. after an impact, because of the lack of excess length in the optical fiber cable. In addition, ice load and wind force impose a higher stress on the system comprising the supporting cable and the optical fiber cable.

DE 195 20 382 A1 deals with a method of installing an optical fiber cable parallel to an existing high voltage overhead line with the help of at least one helically wound adhesive band.

SUMMARY OF THE INVENTION

Starting from this state of the art, the invention is based on the problem of installing a telecommunication cable (e.g., an optical fiber cable) on an existing supporting cable in a way so that necessary repairs can be performed on the telecommunication cable in a simple manner, and excessive wind force on the system comprising the supporting cable and the optical fiber cable is avoided.

The invention solves this problem by attaching the telecommunication cable to the supporting cable in an undulating or wavy manner.

The advantages that can be attained with the invention are particularly that the wave-shaped attachment of the telecommunication cable to the supporting cable produces a clear excess length of the telecommunication cable with respect to the supporting element, even with a comparatively large wavelength. This creates a repair possibility for the telecommunication cable, allowing the removal of a section that was damaged by an impact or a lightning strike for example, and subsequently producing a spliced connection. In addition, the system comprising the telecommunication cable and the supporting cable can be accessed, so that in case of damage it is possible to repair the supporting element without having to remove it from the poles. Beyond that, the installation of the telecommunication cable according to the invention can be performed in a comparatively simple and cost-effective manner. Furthermore, attaching the telecommunication cable to the supporting cable in an undulating form dampens oscillations caused by the wind. In this case, undulating also means a meandering or waveconal attachment of the telecommunication cable, which is expressly included in the protective perimeter.

For a particularly simple and secure attachment of the telecommunication cable to the supporting cable, it is advantageous if the telecommunication cable is attached to the supporting cable with clamps.

For the same reason it is also advantageous if the telecommunication cable is attached to the supporting cable by means of a tape or at least a tie wire. In addition, such an attachment of the telecommunication cable can be produced continuously in a simple and cost-effective manner.

The invention will be fully understood when reference is made to the following detailed description taken in conjunction with the accompanying drawings.

DETAILED DESCRIPTION OF THE INVENTION

Figure 1:
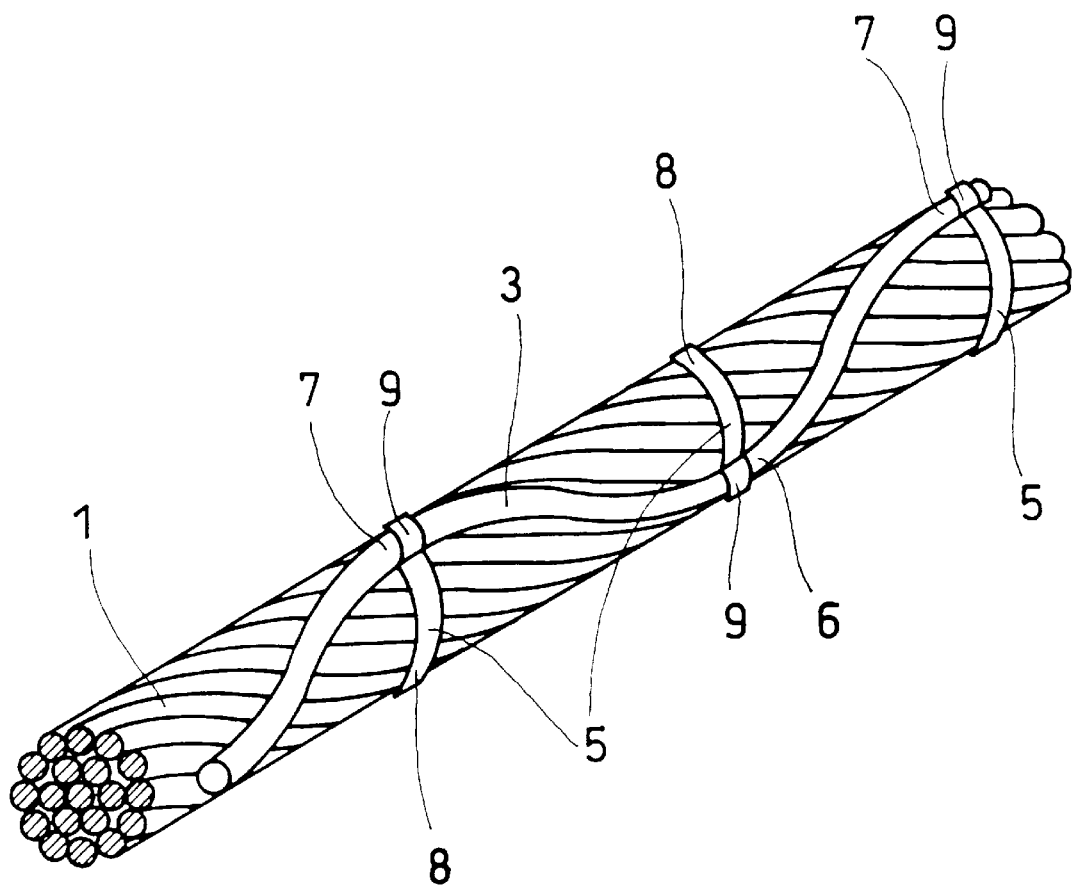
FIGS. 1–3 are perspective views of first, second and third embodiments of an arrangement of a telecommunication cable on a supporting cable in accordance with the invention.
Figure 2:
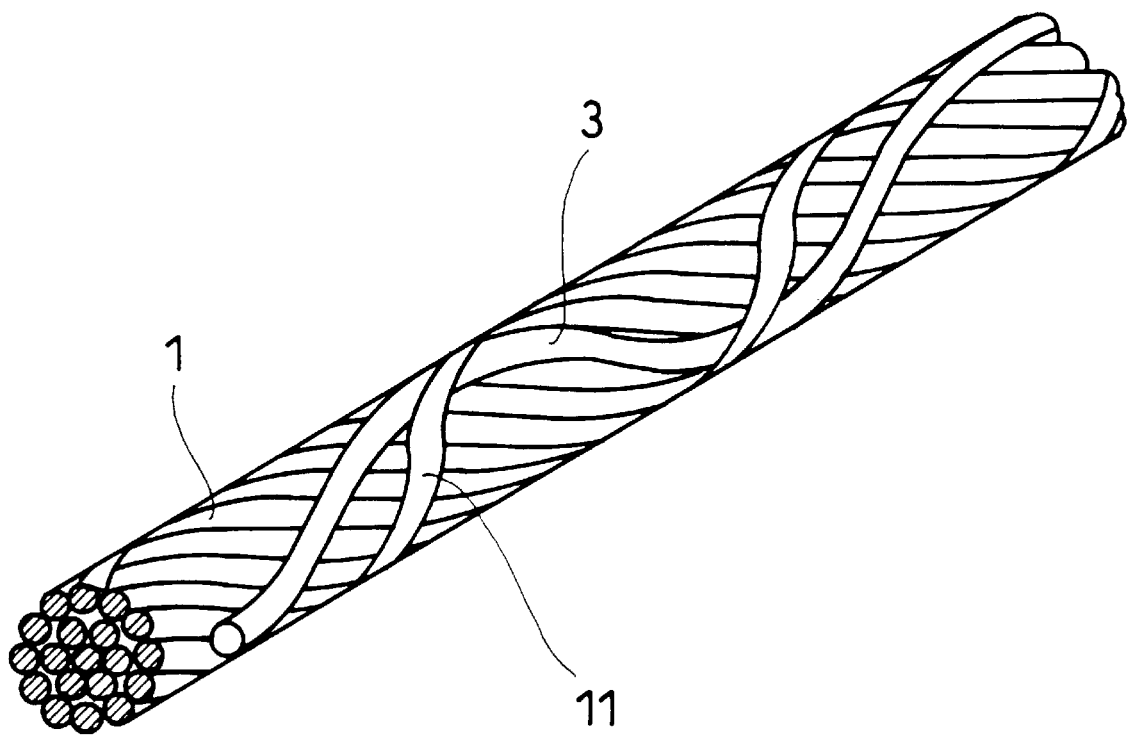
Figure 3:
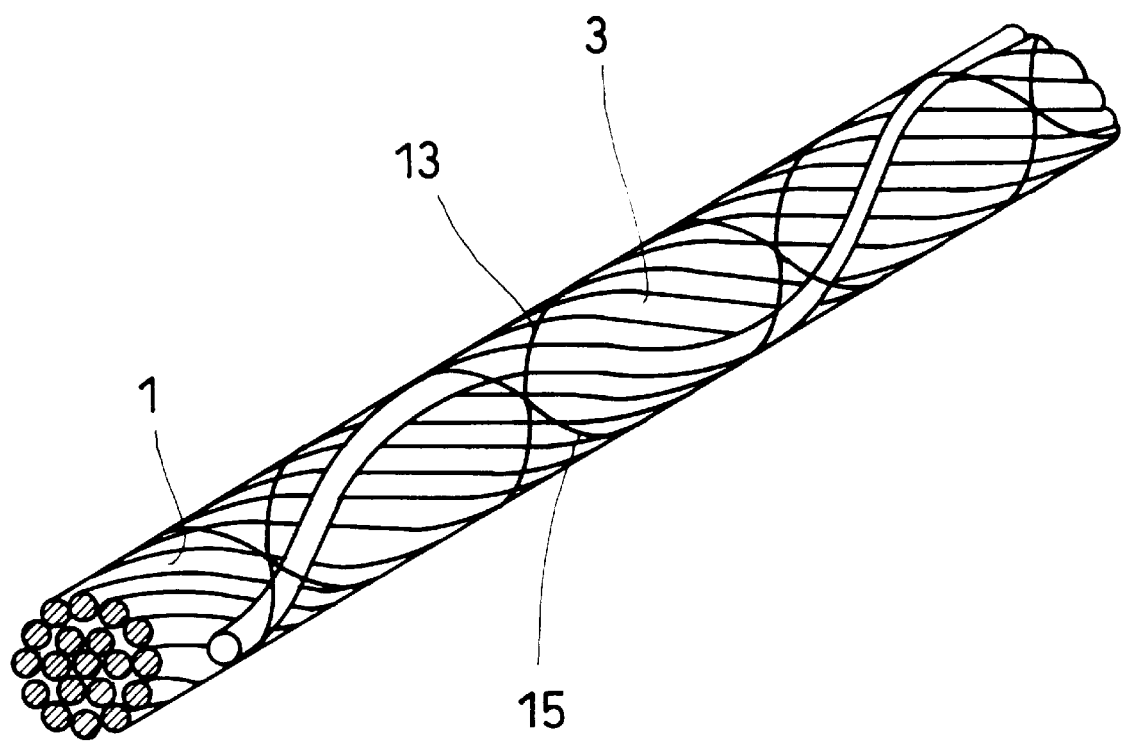

FIGS. 1 to 3 illustrate a ground or phase cable of a high voltage overhead line which is used as a supporting cable 1. A telecommunication cable 3, for example an optical cable containing a number of optical fibers, is attached to this supporting cable 1 in a way so that the telecommunication cable 3 lies directly and in undulating or wavy form against the periphery of the supporting cable. In this way, even a large wavelength of the undulating telecommunication cable 3 produces sufficient excess length of the telecommunication cable with respect to the supporting cable 1 so that repairs, which are required for example after an impact or a lightning strike, can be performed on the telecommunication cable without any problems. Depending on the size of the desired excess length and the total length of the line section, in addition to the wavelength, the amplitude of the telecommunication cable 3 attached in undulating form can also be varied. It can even be imagined in the extreme case that the telecommunication cable is laid entirely around the periphery of the supporting cable 1 in the wave trough or wave crest areas. A undulating course also includes a meandering or waveconal course of the telecommunication cable 3. In contrast to the embodiments, it is also possible for the telecommunication cable 3 to form an irregular wave with excess length on the supporting cable 1.

In the first embodiment illustrated in FIG. 1, the telecommunication cable 3 is attached to the supporting cable 1 in an undulating manner by means of clamps 5, for example at the wave troughs 6 or wave crests 7. The clamps 5 may be the usual clamps for tying telecommunication cables to supporting cables, each having an annular section 8 with a not illustrated slot which wraps around the supporting cable 1, and a cutout 9 for latching the telecommunication cable 3.

In the embodiment illustrated in FIG. 2, the telecommunication cable 3 is attached in undulating form to the supporting cable 1 by means of a tape 11 which is helically wound around the telecommunication cable 3 and the supporting cable 1. For a better hold of the tape 11 on the telecommunication cable 3, it is advantageous if the inside of the tape 11 is coated with an adhesive. It is also possible to provide an additional tape, which is helically placed on the supporting cable 1 and the telecommunication cable 3 in the opposite direction to the first tape 11, thus further improving the hold of the telecommunication cable 3 on the supporting cable 1.

In the third embodiment illustrated in FIG. 3, two tie wires 13 and 15 are provided for attaching the telecommunication cable 3 to the supporting cable 1 in an undulating manner. In that case, the first tie wire 13 is helically applied to the telecommunication cable 3 and supporting cable 1 system. In addition, to secure the attachment of the telecommunication cable 3 to the supporting cable 1, the further tie wire 15 is helically applied in the opposite direction on the supporting cable 1 and the telecommunication cable 3.

The embodiments described above admirably achieve the objects of the invention. However, it will be appreciated that departures can be made by those skilled in the art without departing from the spirit and scope of the invention which is limited only by the following claims.

What is claimed is:

1. A method of installing a telecommunication cable on a supporting cable, particularly on a ground or phase cable of a high voltage overhead line, comprising the steps of: laying a telecommunication cable along a supporting cable in an undulating manner without helically wrapping the telecommunication cable therearound and attaching the telecommunication cable to the supporting cable with at least one attaching element.

2. A method as claimed in claim 1, wherein the at least one attaching element is a plurality of clamps.

3. A method as claimed in claim 1, wherein the at least one attaching element is at least one tape.

4. A method as claimed in claim 1, wherein the at least one attaching element is at least one tie wire.

5. Arrangement of a telecommunication cable on a supporting cable, particularly on a ground or phase cable of a high voltage overhead line, comprising a telecommunication cable laid along a supporting cable in an undulating manner without helically wrapping the telecommunication cable therearound and attached thereto with at least one attaching element.

6. Arrangement as claimed in claim 5, wherein the at least one attaching element is a plurality of clamps.

7. Arrangement as claimed in claim 5, wherein the at least one attaching element is at least one tape.

8. Arrangement as claimed in claim 5, wherein the at least one attaching element is at least one tie wire.

* * * * *

UNITED STATES PATENT AND TRADEMARK OFFICE
CERTIFICATE OF CORRECTION

PATENT NO. : 6,127,626
DATED : October 3, 2000
INVENTOR(S) : Helmut Haag and Georg Hog It is certified that error appears in the above-identified patent and that said Letters Patent is hereby corrected as shown below:

On the cover page of the patent, under "Foreign Patent Documents", "1952038A1" should be --19520382A1--.

Signed and Sealed this

Twenty-fourth Day of April, 2001

Attest:

NICHOLAS P. GODICI

Attesting Officer

Acting Director of the United States Patent and Trademark Office